March 31, 1959     B. S. BLAISSE     2,879,703

PANORAMIC CAMERA

Filed April 8, 1957

BERNDT S. BLAISSE *INVENTOR.*

BY Wenderoth, Lind & Ponack

*Attys*

United States Patent Office 2,879,703
Patented Mar. 31, 1959

2,879,703
PANORAMIC CAMERA

Berndt Stephan Blaisse, Voorburg, Netherlands, assignor to N. V. Optische Industrie "De Oude Delft," Delft, Netherlands Application April 8, 1957, Serial No. 651,224

Claims priority, application Netherlands November 13, 1956

6 Claims. (Cl. 95—16)

The invention relates to panoramic cameras of the type disclosed in my copending application Serial No. 621,794 and more particularly to a shutter adapted for use in such cameras.

As more fully pointed out in the aforementioned application the new type of camera covering fields of view of up to 360° in one direction necessitates the development of shutters of entirely new construction. The present invention has for its primary object to provide a shutter for cameras of the type referred to which, though it may be used for exposures of normal duration, is particularly adapted for extremely short exposure times.

In the shutter according to the invention use is made of the phenomenon known as the "Kerr effect." This phenomenon consists in the fact that certain organic liquid substances, when subjected to the action of an electric field, become birefringent and show the propety of converting a plane-polarized beam of light travelling through the substance in a direction perpendicular to the field direction into an elliptically polarized beam. If a polariber (a crystal or a polarization filter) whose direction of polarization forms an angle of 45° with the field is placed before the liquid, whilst an analyzer whose direction of polarization crosses perpendicularly that of the polarizer is placed after the liquid, the portion of an incident light-ray with energy $I_1$ which the analyzer will transmit after the application of the electric field will be:

$$I_2 = \frac{I_1}{2} \cdot \sin^2(\pi.B.L.F^2)$$

where F is the field strength, L the length of the Kerr cell and B a magnitude characteristic of the liquid, known as the "Kerr constant." Therefore, on increase of the voltage, the amount of light passing through the analyzer becomes greater and greater until total transmission (except for normal losses) is obtained (the point known as the "brightness voltage"). On further increase of field strength the light intensity diminishes (see, for instance, "Photographie et Cinématographie ultra-rapides," Dunod, Paris, 1956, pp. 83 et seq.). It has been found that by generating an electric voltage pulse and applying it to the electrodes of a Kerr cell placed between polarizers in front of a camera lens it is possible to obtain extremely short exposure times, e.g. between $10^{-3}$ and $10^{-6}$ sec. For this purpose the shutter can be so devised that it is actuated by the luminous phenomenon to be photographed itself, which is achieved by causing the pulse circuit to be triggered by a photo-electric cell.

I have discovered that it is possible to design Kerr cell type shutters so as to offer an excellent solution of the shutter problem in the cameras of my copending application Ser. No. 621,794 without disturbing the optical characteristics of the panoramic objective system used therein.

A Kerr shutter for a panoramic camera according to the invention comprises a Kerr cell positioned concentrically with and forming part of the optical system, a cylindrically or spherically curved polarization filter (polarizer) placed in the path of the light-rays before the entrance surface of the Kerr cell, and a likewise cylindrically or spherically curved polarization filter (analyzer) placed behind the exit surface of the Kerr cell, the arrangement being such that both polarizer and analyzer are coaxial with the cylindrical film support or concentric with the optical system as the case may be, whilst their directions of polarization cross each other at right angles at points situated in the same radial plane and form angles of about 45° with this radial plane.

A shutter designed in this way operates absolutely instantaneously for all directions of the large field of view and does not in any way interfere with the concentricity of the optical system.

A Kerr shutter according to the invention may be constructed in different ways, some examples of which will be described hereinafter with reference to the drawings in which.

Figure 1:
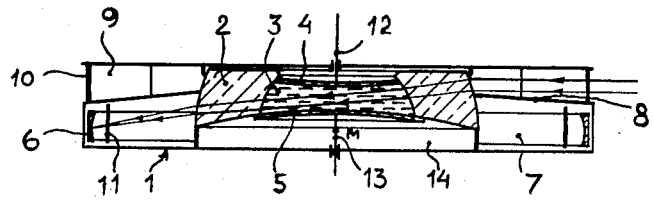
Fig. 1 shows a horizon camera, that is a camera having a field of view in one direction of 360°, equipped with a Kerr shutter arranged in a central position in the optical system.

According to Fig. 1 the optical system mounted in the camera housing 1, consists of the spherical shell 2 and the liquid 3 which wholly or partly fills the space between the plate-shaped electrodes 4 and 5 and the spherical shell 2. The film support 6 is mounted coaxially with the spherical shell 2, 3 in the film chamber 7, which is situated under the ring-shaped partition 8. The light-beams, as shown in the figure, enter the camera over the partition 8, in the course of which they pass through the diaphragm 9 and are deflected downwards by the optical system and focussed on to the film. Mounted before the entrance surface of the optical system is a cylindrical polarizer 10, whilst the likewise cylindrical analyzer 11 is situated in the film chamber 7 in front of the film support 6. The directions of polarization of the two polarization filters cross each other at right angles for each radial direction (and hence for each incident light-beam) and form angles of 45° with the radial plane. Between the plates 4 and 5 by means of which the space inside the spherical shell 2 is sealed liquid-tight, an electric potential can be applied via the conductors 12 and 13.

The plane of polarization of the beams emerging from the polarizer 10 rotates under the action of the electric field set up, enabling the light to reach the film via the analyzer 11.

The electrodes 4 and 5 are curved and have their convex sides facing each other. The object of this is to make the average distance between the plates as small as possible while still affording passage to the light-beams.

The embodiment of Fig. 1 is characterized by a particularly low cell voltage, required for "opening" the shutter. This advantage has been achieved by placing the cell at the centre of the optical system, at which the light-beams occupy a minimum height.

Figure 2:
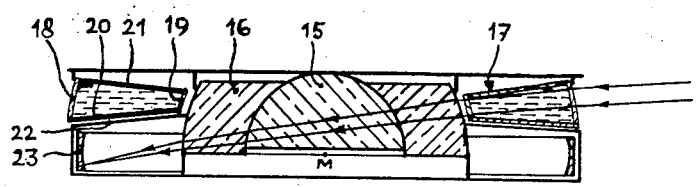
Fig. 2 shows a camera of a construction similar to that of Fig. 1, in which the Kerr cell is designed as a ring-shaped vessel and forms the outer part of the optical system.

The general structure of the camera ccording to Fig. 2 is identical with that of Fig. 1; this time, however, the Kerr cell is designed as a ring-shaped vessel surrounding the optical system 15, 16 and is situated over the partition 22 in the path of the light-rays. The vessel is formed by the vertically positioned, spherically curved polarizing rings 18 and 19 and the horizontally positioned rings 20 and 21 which are electrically conductive or have an electrically conductive coating. The structure as a whole is liquid-tight and is filled with a liquid having the Kerr effect. An alternative possibility is to place in the Kerr cell uniformly spaced, radially directed plate electrodes (not shown in the figure) situated perpendicular to the plane of the spherical shell, which electrodes can be connected in turn to the terminals of the voltage supply unit and also serve to limit the aperture in the direction of the largest visual field angle as described in detail in my copending application Ser. No. 621,794. In this embodiment the electric field thus runs tangentially to the optical system.

Figure 3:
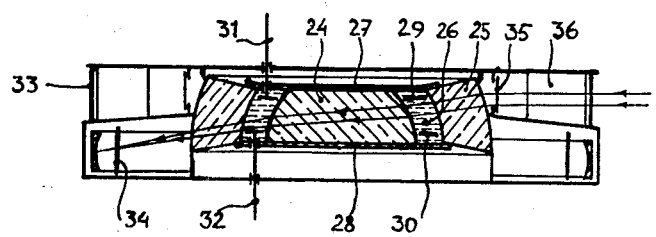
Fig. 3 shows again a camera similar to Fig. 1 and Fig. 2, the Kerr cell, however, forming one of the spherical shells of the optical system.

Fig. 3 gives an embodiment in which the Kerr cell is formed between the spherical shell 25 and the spherical core 24 of the optical system. The space between these elements is occupied by the liquid 26, whilst the rings 29 and 30, situated a certain distance apart, can be subjected to electric potential via the conductors 31 and 32. The cylindrical polarization filters 33 and 34 act as polarizer and analyzer respectively, exactly as in the Fig. 1 embodiment. The elements 24 and 25 of the optical system are centred by means of the plates 27 and 28, which also seal the space for the liquid. The camera is equipped with a diaphragm 36 and a mechanical auxiliary shutter 35.

Although the latter embodiment results in a somewhat wider spacing of the electrodes than in the example of Fig. 1, it offers on the other hand the advantage of enabling a very good correction condition of the optical system to be obtained without difficulty.

For the filling liquid of the Kerr cell a fluid substance must be selected which has a relatively high Kerr constant and does not show too great a light absorption, whilst the index of refraction and the dispersion should be such that, by selecting the right values for the further optical data, a good correction can be obtained.

Very suitable liquids for this purpose are nitrobenzene and phenyl isothiocyanate, some of whose properties will be mentioned below. Moreover, by mixing liquids having different properties it will obviously be possible in some cases to obtain a filling liquid conforming to definite specifications. Furthermore, a colouring substance may be added to the filling liquid so as to permit the Kerr cell to act at the same time as a colour filter obviating deterioration of image quality due to the secondary spectrum.

It is known that manufacturers in this field have not yet succeeded in preparing plate-shaped polarization material of such a quality as to give complete polarization.

It is therefore found in practice that a set of two crossed plates will still admit a certain residual intensity, so that if a film-loaded camera according to the invention is exposed to light for a long period the film will become fogged. Should such exposure be inevitable, it is possible to avoid fogging by equipping the camera with a mechanical auxiliary shutter which can be opened immediately before exposure. Other methods to this effect consist, for instance, in the provision of a continuous film transport mechanism operating at an appropriate low speed which ensures that an unfogged film is at all times available, or in the use of a film emulsion which is insensitive to the wave-lengths transmitted by the analyzer.

For two embodiments of the system according to Fig. 3 the technical data are as follows.

Embodiment I. $f=100$ mm.:
Liquid: nitrobenzene, $n_D=1.553$
$\nu=25.1$
$B=3.86.10^{-5}$ e. s. u.

Radii of spherical shell:
$r_{ext}=60.26$ mm.
$r_{int}=41.04$ mm.

Radius of core:
$r_{core}=30.20$ mm.

Glass of spherical shell:
$SF_2$; $n_D=1.648$
$\nu=33.9$

Glass of core:
$RK_1$; $n_D=1.511$
$\nu=63.6$

Embodiment II. $f=100$ mm.:
Liquid: phenyl isothiocyanate ($C_7H_5NS$),
$n_D=1.651$
$\nu=18.6$ The Kerr constant is about ⅓ of that of nitrobenzene.

Radii of spherical shell:
$r_{ext}=56.5$ mm.
$r_{int}=39.3$ mm.

Radius of core:
$r_{core}=28.4$ mm.

Glass of spherical shell:
$SF_{17}$; $n_D=1.650$
$\nu=33.6$

Glass of core:
$KF_6$; $n_D=1.511$
$\nu=50.9$

What I claim is:

1. A panoramic camera comprising an optical system substantially in the shape of a transparent disk having spherical external and internal refractive surfaces whose centers of curvature are substantially coincident, a first area of said spherical external surface being exposed to incident light-rays and serving as an entrance surface for such light-rays, a second area of said spherical external surface serving as an exit surface, a cylindrical transparent film carrier located opposite said exit surface and having its axis intercepting said centers of curvature, stop means mounted before said entrance surface for preventing incident light-rays not substantially radial to said optical system from entering said system, a shutter of the Kerr cell type comprising an amount of liquid exhibiting the Kerr effect, transparent walls of spherical shape confining said liquid so as to form part of said optical system, a pair of polarizing filters of substantially cylindrical shape having their axes coinciding with said axis of said film carrier, one of said filters being mounted in the path of the light-rays so as to be passed before said rays enter said liquid, the other of said filters being located in the path of said light-rays so as to be passed after said rays have left said liquid, the directions of polarization of said filters crossing each other perpendicularly in points situated in planes radial to said optical system and including angles of substantially 45° with such radial planes, and electrode means associated with said liquid adapted to set up electrical field strengths in said liquid substantially perpendicular to the direction of travel of said light-rays.

2. A panoramic camera as claimed in claim 1 wherein said liquid is contained in a transparent vessel mounted before said entrance surface of said optical system.

3. A panoramic camera as claimed in claim 2 wherein said stop means are identical to said electrode means and comprise a plurality of thin opaque blades of electrically conductive material disposed at uniform distances apart in said liquid in planes radial to said optical system.

4. A panoramic camera as claimed in claim 1 wherein said liquid is confined in a central cavity in said optical system, said electrode means comprising a pair of electrically conductive plates disposed in said liquid opposite each other and perpendicular to the axis of said film carrier.

5. A panoramic camera as claimed in claim 4 wherein said plates are curved, the convex sides of the plates facing each other.

6. A panoramic camera as claimed in claim 1 wherein said liquid is confined in a ring-shaped cavity in said optical system, said electrode means comprising a pair of electrically conductive rings disposed in said liquid opposite each other.

References Cited in the file of this patent

UNITED STATES PATENTS

| | | |
|---|---|---|
| 548,700 | Crehore | Oct. 29, 1895 |
| 2,713,809 | Cooke | July 26, 1955 |

FOREIGN PATENTS

| | | |
|---|---|---|
| 6,870 | Switzerland | May 23, 1893 |